Jan. 23, 1940.  R. S. BATEMAN  2,188,029
CULTIVATOR
Filed April 14, 1939  4 Sheets-Sheet 1

Inventor
Raymond S. Bateman
By Clarence A. O'Brien
and Hyman Berman
Attorneys

Jan. 23, 1940.     R. S. BATEMAN     2,188,029
CULTIVATOR
Filed April 14, 1939     4 Sheets-Sheet 2

Inventor
Raymond S. Bateman

By Clarence A. O'Brien
and Hyman Berman
Attorneys

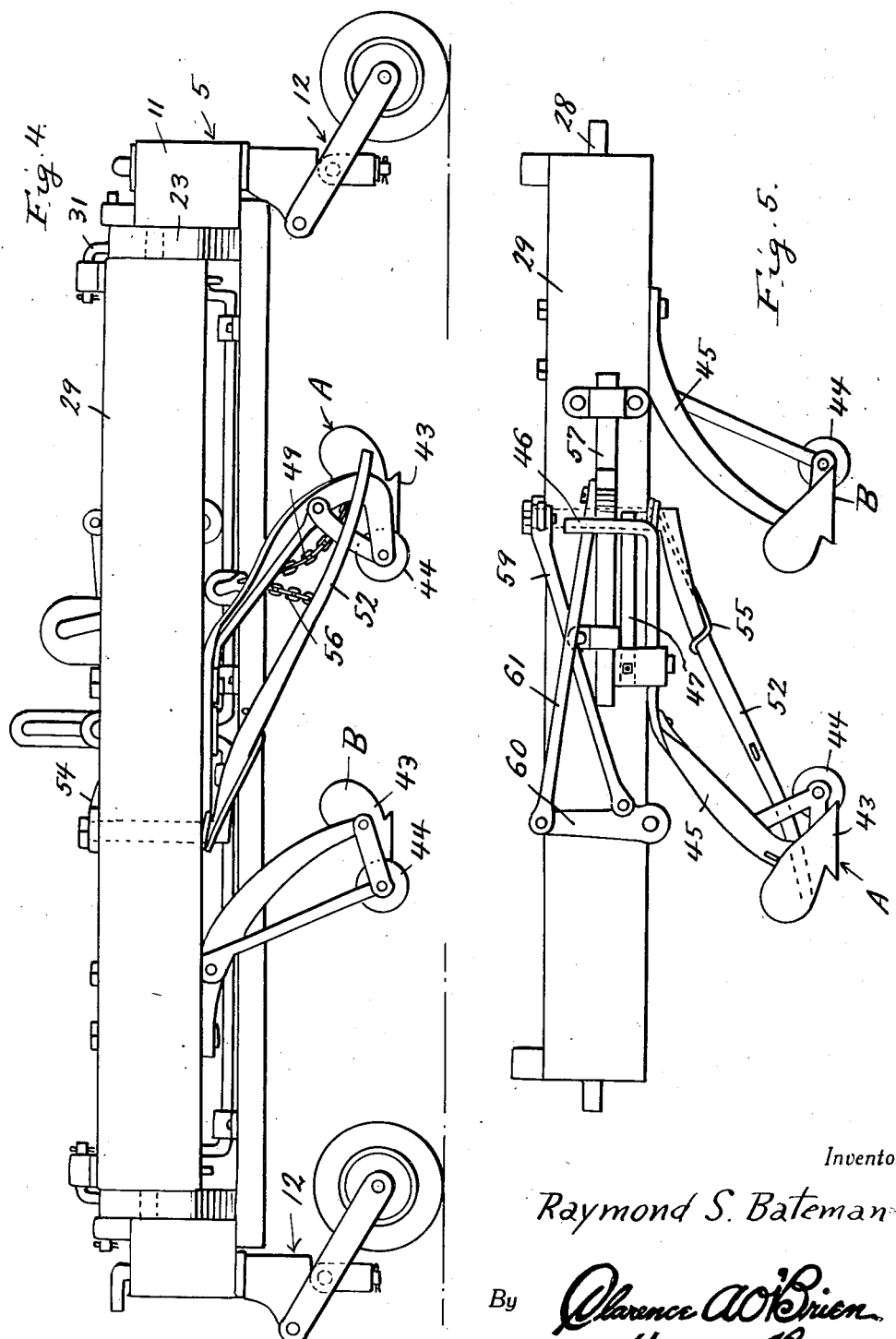

Jan. 23, 1940.                    R. S. BATEMAN                    2,188,029
                                     CULTIVATOR
                              Filed April 14, 1939            4 Sheets-Sheet 4
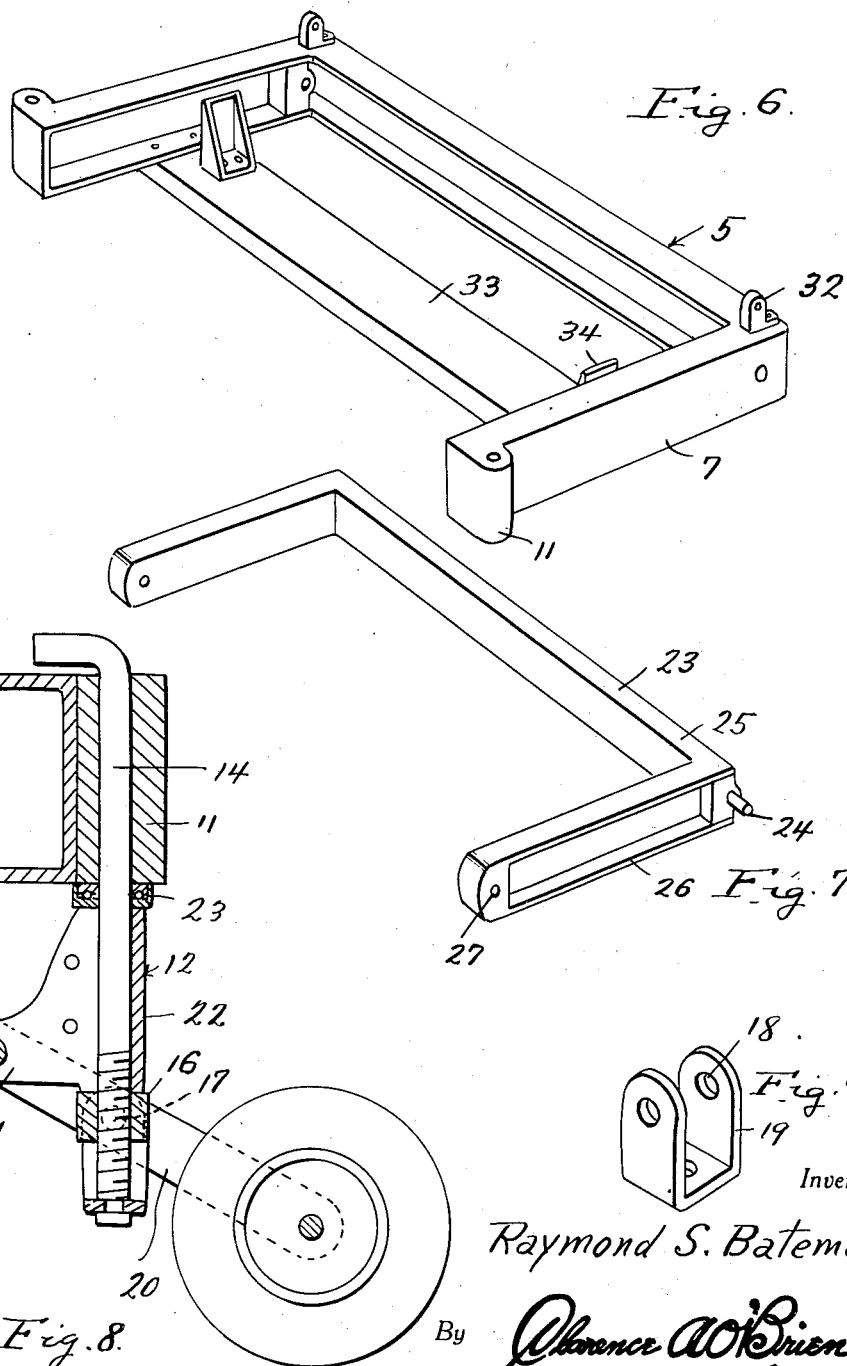
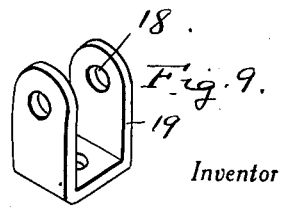
Inventor
Raymond S. Bateman
By Clarence A. O'Brien
and Hyman Berman
Attorneys Patented Jan. 23, 1940

2,188,029

UNITED STATES PATENT OFFICE 2,188,029

CULTIVATOR

Raymond S. Bateman, Lindsay, Calif.

Application April 14, 1939, Serial No. 267,880

5 Claims. (Cl. 97—47)

This invention relates to a cultivator operable by a tractor and is especially adapted for cultivating vineyards and the like or may be used for cultivating row crops, and has for the primary object the provision of a device of this character which operates to one side of the tractor and is easily adjusted and controlled by the driver of the tractor.

Another object of this invention is the provision of a device of the above stated character which includes a row side cultivating implement and a second cultivating implement for cultivating the soil between the first implement and the tractor with means whereby both cultivating implements may be adjusted to regulate the cultivating depth of the soil and further includes means for adjusting the operating position of the first or row side cultivating implement with respect to the second cultivating implement so that the soil may be worked as close to the row crop as desired and also has associated therewith a vine guard simultaneously adjusted with the row side cultivating implement.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a cultivator constructed in accordance with my invention and showing the same arranged for operation to one side of a tractor, the latter being shown fragmentarily in dotted lines.

Figure 4 is a side elevation illustrating the cultivator.

Figure 5 is a side elevation illustrating an implement carrying bar and showing the implements mounted thereon.

Figure 6 is a perspective view illustrating a main or outer frame.

Figure 7 is a perspective view illustrating an auxiliary or inner frame.

Figure 8 is a fragmentary vertical sectional view showing one of the supporting wheels and its connection with the main or outer frame.

Figure 9 is a perspective view illustrating a U-bracket used in the construction of the wheel mounting.

Figure 1:
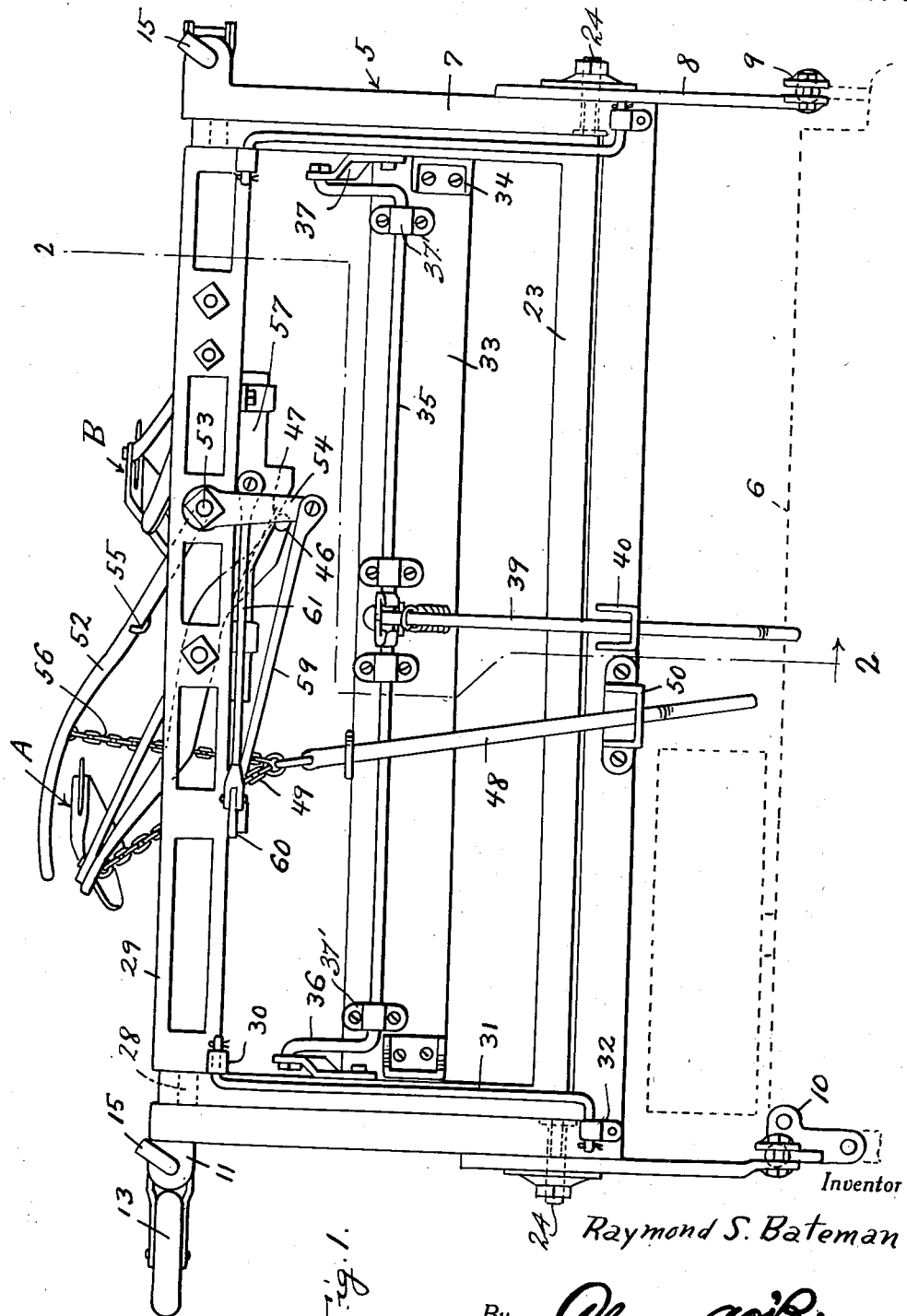
Figure 2:
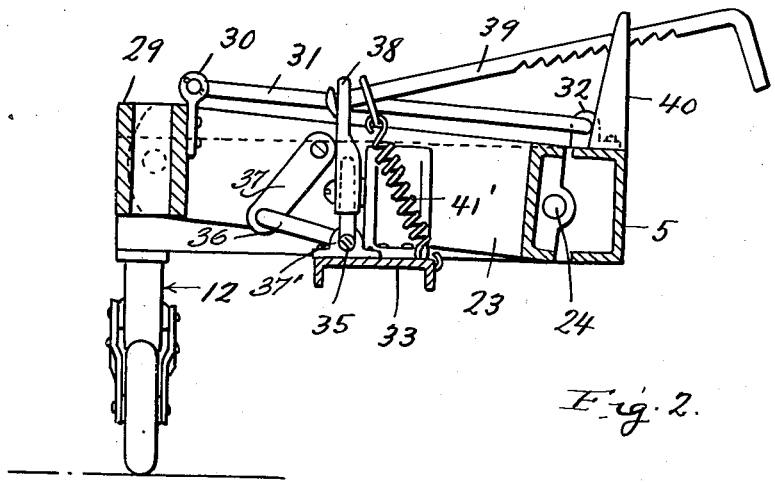
Figure 2 is a sectional view taken on the line 2—2 of Figure 1.

Referring in detail to the drawings, the numeral 5 indicates a main or outer frame of substantially U shape and constructed of channel iron material. The open or outer side of the frame 5 is adapted when in operation to be arranged next to the row crop while its connecting or bight portion is adapted to be arranged adjacent to the side of a tractor, the latter being indicated in dotted lines and by the character 6. The arm portions of the frame 5 are indicated by the character 7, one forming the front end of the device and the other the rear end of said device. The arm portions 7 have attaching arms 8 adjustably secured thereto and include ball and socket joints 9. The attaching arms 8 are adapted to be secured on the tractor, as shown at 10, positioning the frame 5 to one side of the tractor and at a selected distance therefrom. The ends of the arm portions are enlarged, as shown at 11, to which are connected wheel mountings 12 carrying ground wheels 13 of the pilot type, that is, wheels which are capable of swinging in either direction about a vertical axis so that the frame 5 will readily follow the direction of travel of the tractor.

Each wheel mounting 12 consists of a stem 14 journaled in the enlargement of the frame 5 and has its upper end offset to form a handle portion 15. A feed nut 16 is threaded on the stem 14 and is provided with pintles 17 received in openings 18 of a substantially U-shaped bracket 19, the latter being journaled on the lower end of the stem. The pintles 17 also extend through openings provided in axle levers or arms 20 which are in turn pivoted on an extension 21 of a sleeve 22. The sleeve is journaled on the stem 14 and is supported by the feed nut and carries at its upper end an anti-friction bearing 23 on which the frame 5 or the enlargement 11 thereof rests. The ground wheels 13 are journaled on the free ends of the arms or levers 20. By rotating the stem 14 in opposite directions, the ground wheel will be caused to move toward and from the frame. This adjustment is for the purpose of regulating the distance of the frame 5 at its row side with respect to the ground and for the purpose of leveling the frame with respect to its mounting on the tractor. The sleeve 22 being journaled on the stem will allow the ground wheel to swing in either direction.

An inner or auxiliary frame 23 of substantially U-shape is equipped with pintles 24 for journaling the inner frame on the main frame 5, the connecting portion 25 of the inner frame lying adjacent to the connecting portion of the main frame 5, the open side of the inner frame being disposed at the row side of the device. The arm portions 26 of the inner frame 23 at the free ends are provided with bearing openings 27 to receive pintles 28 of an implement bar 29. The implement bar is arranged at the row side of the device and has apertured ears 30 in which are journaled links 31. The links 31 are also journaled in apertured ears 32 mounted on the frame 5 at the tractor side thereof. The purpose of the links 31 is to maintain the implement bar at a selected position during the hinging movement of the inner frame with respect to the main frame 5.

A supporting plate 33 is carried by the arm portions of the main frame 5 and disposed under the inner frame and has secured thereon guide brackets 34 for guiding the swinging movement of the inner frame upon the main frame and also has journaled thereon by bearings 37' a shaft 35 provided with cranks 36 journaled in brackets 37 secured on the inner frame. A rotation of the shaft 35 in one direction will swing the inner frame upwardly on the main frame 5 and a reverse rotation of the shaft 35 will swing the inner frame downwardly. The implement bar 29 being carried by the inner frame and due to the fact that the latter can be swung upwardly and downwardly will bring about adjustment of the implement bar toward and from the ground and consequently regulate the depth of cultivating the soil by the cultivating implements carried by the implement bar.

An arm 38 is secured on the shaft 35 and has pivotally connected thereto an operating rod 39 slidably supported by a bracket 40 on the main frame 5. The operating rod 39 has a series of notches 41 to coact with the bracket 40 in releasably securing the operating rod at various positions for the purpose of maintaining the inner frame at selected positions with respect to the main frame. A coil spring 41 is connected to the operating rod 39 and to the plate 33 tending to urge the notches into engagement with the bracket 40 at all times.

The handle of the operating rod 39 is located adjacent the operator on the tractor so that the adjustment of the inner frame may be readily brought about when desired.

The bar 29 carries a row side cultivating implement A and a cultivating implement B arranged in advance of the implement A and further from the row crop than said implement A and is fixed on the implement bar 29. The implements A and B include ground working elements 43 similar in construction and also include colters 44 and each an implement beam 45. The beam 45 of the implement B is bolted or otherwise secured on the bar 29 while the implement beam 45 of the implement A is journaled on the implement bar 29 and includes an upstanding extension 46 arranged on the opposite side of the bar 29 from the ground working element 43 of the implement A and is engaged by a spring 47, tending to swing the implement A toward the row crop during the operation of the device. The implement A is connected to a control rod 48 by a flexible element 49 and the control rod is located adjacent the operating rod 39 and is slidably mounted in a bracket 50 provided therefor on the main frame 5. The control rod 48 is equipped with notches 51 to coact with the bracket 50 for restraining the swinging movement of the implement A under the influence of the spring 47 and provides a construction whereby the operator may draw the implement A away from the row crop.

A row crop guard 52 includes a shaft 53 journaled on the member 29 to which an arm 54 is secured. The guard 52 is adapted to extend so that its free end portion operates between the implement A and the row crop and is urged in the direction of the row crop by a spring 55. A flexible element 56 connects the guard 52 to the control rod 48 so that said guard will be moved simultaneously with the implement A by said control rod 48 and in a direction away from the row crop.

A wedge member 57 is slidably mounted on the member 29 and engages with the upstanding end 46 of the beam of the implement A for the purpose of locking the implement A against swinging movement under the influence of the control rod 48 or away from the row crop while the spring 47 tends to swing the implement A toward the row crop. Thereby it will be seen that when the wedge member 57 is in engagement with the upstanding end 46 of the beam of the implement A and the control rod 48 secured by the bracket 50, the implement A will be maintained in a selected position between the frame 5 and the row crop.

The arm 54 swings with the guard 52 and has pivoted thereto a link 59 which is in turn pivoted on a lever 60. The lever 60 is pivoted on the member 29 and is connected to the wedge member 57 by a link 61, the purpose of which is to impart sliding movement to the wedge member 57 in accordance with the movement of the guard 52. It is to be understood that the guard 52 when actuated by the control rod 48 will move slightly in advance to the movement of the implement A by the control rod so that the wedge member will be slid forwardly out of the path of the upstanding end 46 of the implement beam of the implement A so that the latter-named implement can move by the influence of the control rod 48 away from the row crop.

From the foregoing description, taken in connection with the accompanying drawings, it will be seen that provision has been made whereby the implement A can be readily adjusted toward and from the row crop and also whereby the implements A and B may be adjusted for the purpose of varying their depth of action on the soil, all of which adjustments are easily controlled by the operator of the tractor.

Figure 3:
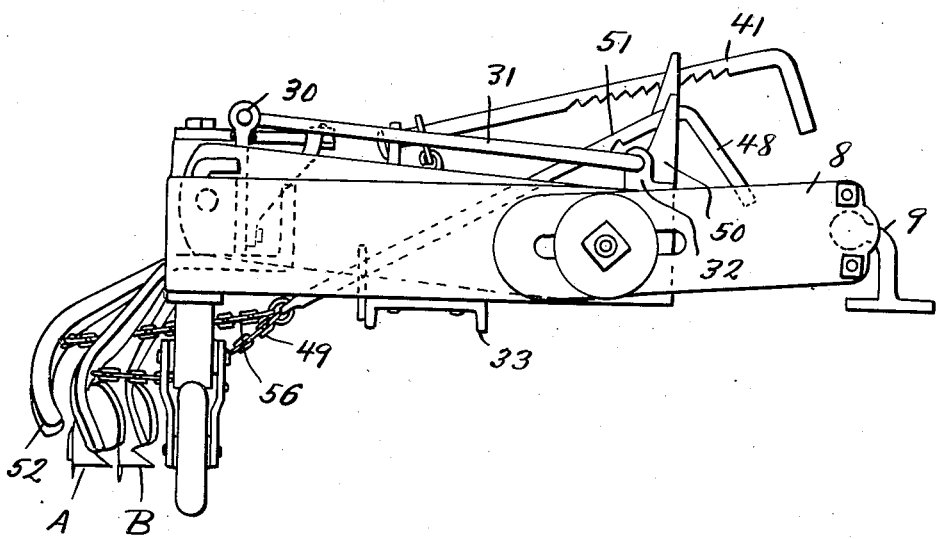
Figure 3 is a rear elevation illustrating the cultivator.

As shown in Figure 3 the arms 8 are adjustably secured on the frame 5 so that the frame may be adjusted toward and from the tractor to meet with different working conditions that may arise in cultivating different kinds of vegetation and vines within a vineyard and further it is to be seen that this device can be conveniently adapted for operation on a conventional type of tractor and will successfully operate to one side of the tractor.

It is believed that the foregoing description, when taken in connection with the drawings will fully set forth the construction and advantages of this invention to those skilled in the art to which such a device relates, so that further detailed description will not be required.

Having thus described my invention, what I claim is:

1. A cultivator comprising a main frame, means for pivotally mounting said frame on a tractor, ground wheels for said frame and capable of swinging in either direction on said frame, an inner frame journaled on the main frame, an implement carrying member journaled on the second frame, connecting means between said implement carrying member and the main frame to maintain the implement carrying member in a selected position during pivotal movement of the inner frame, cultivating implements carried by said implement carrying member, and a control device connected to said inner frame for bringing about pivotal movement thereof.

2. A cultivator comprising a main frame, means for pivotally and adjustably connecting the main frame to a tractor, pilot type ground wheels for said main frame, an inner frame hinged on the main frame, an implement carrying bar journaled on the inner frame, hinged type links connecting the implement member to the main frame, means for raising and lowering the inner frame with respect to the main frame, and implements carried by the implement carrying member.

3. A cultivator comprising a main frame, means for mounting said frame on a tractor, ground wheels for said frame, an inner frame hinged on the main frame, an operating shaft carried by the main frame and including cranks, means connecting said cranks to the inner frame, an operating means for said shaft whereby the inner frame may be raised and lowered, an implement carrying member journaled on the inner frame, a hinged means connecting the implement carrying member with the main frame, an implement beam secured to said implement carrying member, an implement beam journaled on said implement carrying member, ground cultivating elements carried by said beams with one of the elements positioned laterally of the other element, spring means acting on the pivoted beam to urge the latter in one direction, a control mechanism connected to the latter-named beam.

4. A cultivator comprising a main frame, means for mounting said frame on a tractor, ground wheels for said frame, an inner frame hinged on the main frame, an operating shaft carried by the main frame and including cranks, means connecting said cranks to the inner frame, an operating means for said shaft whereby the inner frame may be raised and lowered, an implement carrying member journaled on the inner frame, a hinged means connecting the implement carrying member with the main frame, an implement beam secured to said implement carrying member, an implement beam journaled on said implement carrying member, ground cultivating elements carried by said beams with one of the elements positioned laterally of the other element, spring means acting on the pivoted beam to urge the latter in one direction, a control mechanism connected to the latter-named beam, a vine guard pivoted on the implement carrying member and spring influenced in one direction and connected to said control device, a wedge member slidably mounted on the implement carrying member to coact with the pivoted beam to secure the latter against pivotal movement, and an operating means connected with said guard and wedge member to free the pivoted beam on movement of the guard by said control mechanism.

5. In a cultivator, a frame, a cultivating implement fixed to said frame, a second cultivating implement including a beam mounted on said frame for swinging movement, a spring means acting on said beam to swing said second implement in one direction, and a hand control means for restraining said beam under action of said spring means, and a wedging means for releasably securing said beam and actuated by said hand control.

RAYMOND S. BATEMAN.